Figure 2:
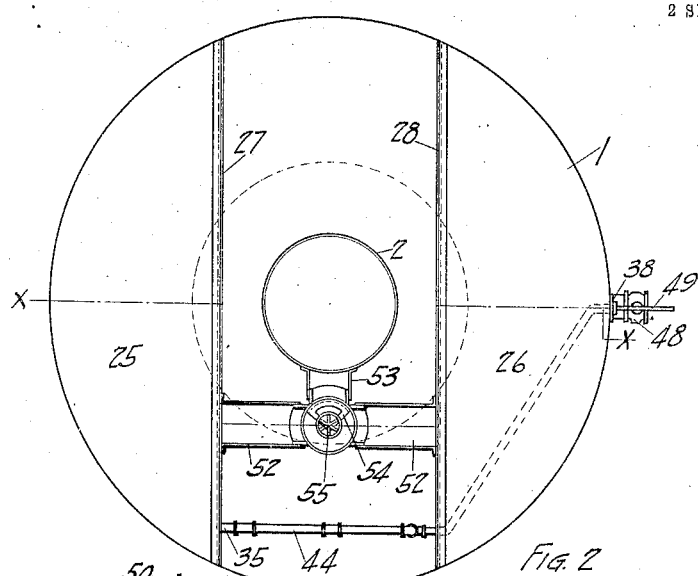

C. L. KENNICOTT.
WATER TREATING APPARATUS.
APPLICATION FILED APR. 6, 1914.

1,114,146.

Patented Oct. 20, 1914.
2 SHEETS—SHEET 1.

WITNESSES

INVENTOR

C. L. KENNICOTT.
WATER TREATING APPARATUS.
APPLICATION FILED APR. 6, 1914.

1,114,146.

Patented Oct. 20, 1914.
2 SHEETS—SHEET 2.

UNITED STATES PATENT OFFICE.

CASS L. KENNICOTT, OF CHICAGO HEIGHTS, ILLINOIS.

WATER-TREATING APPARATUS.

1,114,146.   Specification of Letters Patent.   Patented Oct. 20, 1914.

Application filed April 6, 1914.   Serial No. 830,042.

*To all whom it may concern:*

Be it known that I, CASS L. KENNICOTT, a citizen of the United States, residing in Chicago Heights, county of Cook, and State of Illinois, have invented new and useful Improvements in Water-Treating Apparatus, of which the following is a specification.

In devices for treating water and particularly for softening water, filters are used in many cases for filtering the water. The filter may be installed to filter the water either before or after it is softened.

In treating water with chemicals it has been found that the chemicals added to the raw water do not react to the fullest extent during the limited time that water usually remains in such an apparatus and some of the chemicals may be carried away with sediment in the softened water without having formed a part in the reaction. Filters have been used for the purpose of filtering from the water, sediment including chemicals which may not have reacted and as the filtering material within the filters becomes clogged due to the accumulation of sediment therein it has been customary to wash the filter and allow the wash water containing the sediment together with chemicals which have not reacted to pass from the filter to the sewer. By this method an extra pipe line is needed to conduct the wash water to the sewer and a portion of the chemicals may be wasted. In devices of this character where storage of water which has been softened is required, it has been customary to provide storage space for water above the filter so that when it is desired to use water at a rate greater than the softening apparatus will satisfactorily handle it the water above the filter may be drawn therethrough due to pressure of the water or due to negative head created within the filter by the flow of water from the filter. This arrangement has the disadvantage that water is not available for use at a greater rate than it can be handled through the filter.

One of the objects of this invention is to produce a water treating apparatus which will conserve the chemicals; another object is to do away with the use of a separate pipe line for conveying wash water from the filter; another object is to provide a supply of water completely treated by both softener and filter in a conveniently arranged storage chamber so that this stored water will be available for immediate use at a rate which is not limited by the filter; other objects are the construction of a device of this character which is compact and simple in construction, which can be easily operated and which shall be efficient in the treatment of water. These objects I accomplish by constructing a water treating apparatus comprising a sedimentation tank and preferably having a conduit leading into the tank; by providing means for filtering sediment from the water, and for washing sediment from the filtering means into the tank; by providing an efficient method of cleaning sediment from the tank and by certain constructions which will be hereinafter more fully described.

It is well known that by adding old precipitate to raw water with the fresh chemicals the reaction is made more complete and it will be seen that in addition to reclaiming unused chemicals I cause a more complete reaction of the fresh chemicals thereby further conserving chemicals and producing more efficient results.

Figure 1:
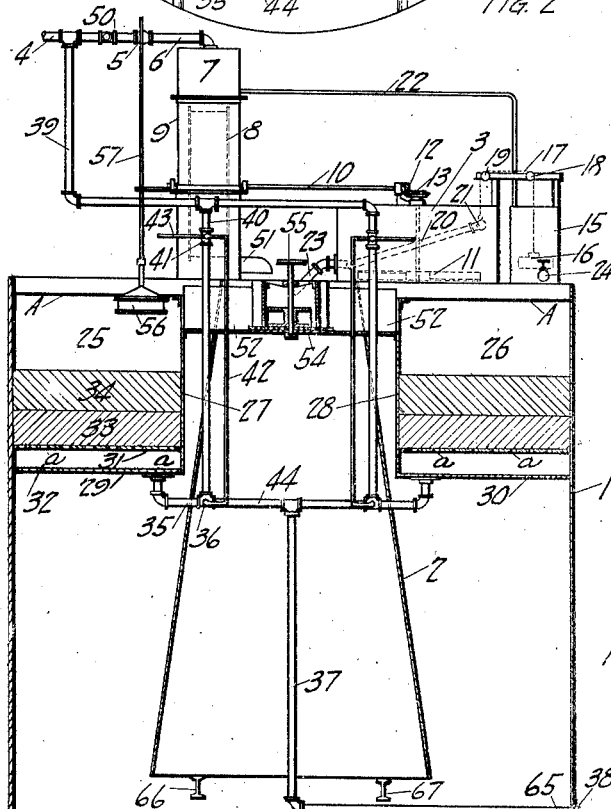
Figure 4:
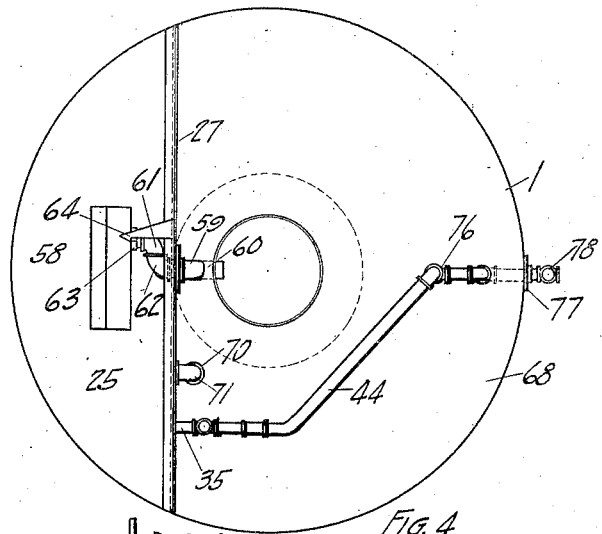
Figure 3:
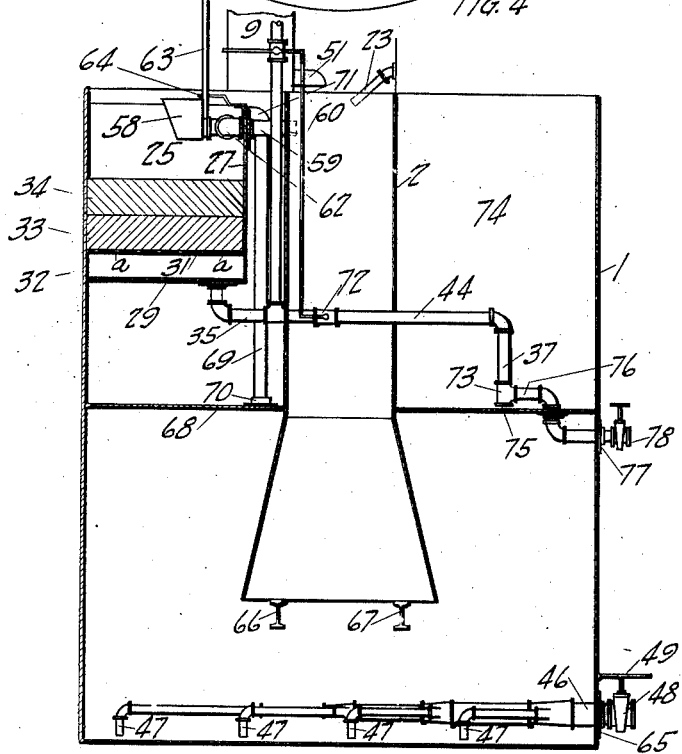

In the accompanying drawings, Figure 1 represents an elevational view partly in section of a device embodying one form of my invention, the view being taken on the line *x—x* of Fig. 2; Fig. 2 represents a plan view of Fig. 1 with the apportioning apparatus removed; Fig. 3 represents an elevation of a modification of my invention with apportioning apparatus removed while Fig. 4 shows a plan view of Fig. 3.

Referring to Fig. 1, 1 represents a tank comprising a sedimentation chamber of a water treating apparatus which may be of any desired form. A conduit or downtake 2 may extend into the sedimentation tank and be adapted to lead water into the tank. The downtake may be supported in any preferred manner as by I-beams 66 and 67 extending from the sides of the tank. Any desired mechanism may be used for apportioning chemicals for treating or softening the water and in Fig. 1 a suitable chemical tank 3 is shown which may contain the chemicals to be delivered for softening water. Water enters through the main supply line 4 and passes through a balanced valve 5 which controls the supply as hereinafter described. Water is then delivered through the pipe 6 to the raw water box 7 which may contain means for dividing the supply into two portions. The main portion of the water passes to a water wheel 8 which is positioned within the shield 9 thereby driving the shaft 10 and operating suitable agitating mechanism as shown at 11 within the chemical tank 3. Bevel gears 12 and 13 may be used to transmit motion from the shaft 10 to the agitating mechanism. After passing over the water wheel 8, the main portion of the water is delivered from the bottom of the shield 9 through the spout 51 and into the tank or preferably into a conduit or downtake 2 extending into the tank 1. A regulating tank 15 contains a float 16 which is attached by means of a chain or flexible cable 17 passing over pulleys 18 and 19 to a lift pipe 20 within the chemical tank 3. The smaller portion of the water in the raw water box 7 passes through the pipe 22 to the regulating tank 15. The intake end 21 of the lift pipe 20 is a relatively large opening so that the level of chemicals within the tank 3 will be maintained at the level of the intake end 21. As the float 16 rises due to the rise of water in the regulating tank 15 the intake end 21 will fall thereby delivering chemicals through the pipe 23 to the upper end of the downtake 2 where the chemicals will mix with the raw water issuing from the spout 51. The amount of water passing through the pipe 22 together with the quantity of chemicals in the chemical tank should be adjusted so that the regulating tank 15 will fill and the chemical tank 3 will empty in the correct proportion to the raw water delivered by the spout 51, to the tank. A valve 24 may be used to drain water from the regulating tank when a new charge of chemicals is being prepared. The chemicals and raw water will then be delivered to the upper end of the conduit 2 in the proper proportion for treating the water and are conveyed preferably in a downward direction into sedimentation tank 1. The water may then pass upward in the space between the conduit 2 and the sides of the tank 1 to the upper part of the tank.

The filter or in some cases, more than one filter, may be built in the upper part of the tank or the filter may be separate from the tank. In Fig. 1 two filters are shown built in the upper portion of the tank. Two compartments 25 and 26 may be formed in segmental shape by plates 27 and 28 and by plates 29 and 30 which form the sides and bottoms of the compartments respectively. The sides 27 and 28 of the filters may, of course, be designed so as to support the weight of the filtering material or any suitable method of supporting the filter may be used. As both filters are similar a description of filtering compartment 25 will suffice. A suitable screen or a plate 31 with openings $a$, $a$, is placed across the compartment 25 leaving a small space 32 for filtered water. Quartz, gravel or other suitable filtering material may be placed upon the screen as shown at 33 and 34. Water enters the filtering compartment over the upper edge of the plate 27 which is below the level A—A and below the upper edge of the sedimentation tank 1. The water then passes through the filtering material where sediment is filtered from the water and the filtered water then passes through the pipe 35, a three-way valve 36 and pipe 44 to the pipe 37 and thence to the outlet connection 38 which leads from the apparatus.

A pipe line 39 connects to the main supply line 4 and is adapted to supply the water for washing the filter. A pipe 40 leading from the pipe 39 and containing the valve 41 connects with the valve 36. The valves 36 and 41 are connected by means of a rod 42 and may be operated simultaneously by moving the lever arm 43.

The valves operate as follows: When the lever arm 43, of valve 41 is raised the valve 41 opens and the three-way valve 36 operates to form communication between the pipe 40 and 35 and to close communication to the pipe 44. When the lever arm 43 is lowered a reverse operation takes place.

Suitable mechanism may be installed in the bottom of the sedimentation tank for delivering sludge or sediment therefrom and may comprise a pipe system 46 having a series of pick-up pipes 47 leading thereto. Pipe 46 leads to the flange 65 on the outside of the tank 1 and terminates in a valve 48 having a lever arm 49 for its operation. When the lever arm 49 is raised the valve is opened and the weight of the water within the sedimentation tank causes the sludge or sediment to pass through the pipes 47 to the pipe 46 and through the valve 48 which may deliver to the sewer.

A valve 50 in the supply line 4 may be used to cut off the supply of water to be treated and a float 56 actuated by the level of water within the tank 1 or in the filter 25 may operate the valve 5 through the connecting rod 57 and automatically control the supply of water to the apparatus when the valve 50 is open.

Where two filters are employed a channel 52 may connect the two filters for the purpose of equalizing the head in the filters and may have a chute 53 leading therefrom into the conduit 2. The sides 27 and 28 of the filters are cut down at the points where they meet the channel 52 and are attached thereto by water tight connections. The bottom of the channel is below the tops of the sides 27 and 28 so that while the filter is being washed the water flows from the filters to the channel without passing over the upper edges of the sides. A suitable valve 54 operated by a handle 55 may be used to control the passage of water through the channel 52 and chute 53. In the position shown in Fig. 2 the valve will allow the two filters to communicate and both of the filters may be used for filtering the water. In washing the filter 25 the valve 54 should be turned so as to cut off communication with the filter 26 and place the channel 52 in communication with the chute 53 so that the wash water will pass to the conduit.

One particular feature of my invention is the method of cleaning the sediment from the apparatus which should be as follows: The supply of water to be treated should be cut off by closing the valve 50 in the supply line 4. The valve 48 may then be opened which will allow the sediment that has accumulated at the bottom of the tank 1 to pass off, with the corresponding fall of the water level in the upper part of the tank. The lever arm 43 may then be raised which delivers water through the valve 35 for the purpose of washing the filter and the water will pass in a reverse direction through the filter causing the sediment to be washed from the filtering material into the channel 52 and chute 53 which conveys water to the conduit 2. The filter 26 may be washed in a similar manner by turning the valve 54 so as to cut off communication with filter 25. The wash water containing the sediment which has been washed from the filter will then pass through the channel into the conduit and any chemicals which have not reacted will be again mixed with the water in the downtake and given an opportunity to complete their reaction and the addition of this precipitate will aid in further reaction as previously described. The conduit 2 keeps the wash water separate from the water which is in the upper part of the tank and which is treated water and the filter may be washed until the water level within the tank 1 rises to the desired height. The sediment from the filter which is delivered to the conduit will then be of considerable volume and will precipitate properly and pass to the bottom of the tank where it may be removed when desired.

In Figs. 3 and 4 the filtering compartment 25 is shown in connection with a storage chamber 74 formed in the tank for storing softened and filtered water. A head or diaphragm 68 extends across the tank and the conduit 2 leads from the top of the tank down through the storage chamber to the sedimentation chamber in the lower part of the tank. A pipe 69 connects to the head 68 by a flange and leads softened water through the elbow 71 to the upper part of the filtering compartment 25. A valve 72 in the pipe 44 performs the same service as valve 36, previously described. The pipe 37 leads downward from pipe 44 and has a T 73 forming communication with the storage chamber 74 at the point 75. The pipe 76 is adapted to lead water from the pipe 37 and from storage chamber 74 to the outlet flange 77 and a valve 78 may of course be used to govern the amount of water taken from the apparatus. The water passing through the filter will pass through the piping and to the storage chamber 74 under ordinary rates of flow but when the valve 78 is opened more and a greater rate of flow is desired, filtered water from the storage chamber 74 will also be delivered through the valve 78. Water is made to flow through the filter by the difference in level of water in the filter and storage chamber and it should be noted that as water is drawn from the storage chamber this difference in head increases thereby automatically causing more water to be delivered from the filter and the difference in head may be increased until the level within the storage chamber is lowered to the open end 75 of the T 73. In Figs. 3 and 4 another method is shown of forming a communication between a filter and the conduit. A pipe 59 is attached to the side 27 of the filter and extends from the filter through the wall of the conduit as shown dotted at 60. A swivel connection formed by two elbows 61 and 62, Fig. 4, forms a connection between the pipe 59 and a hopper 58 within the filtering compartment 25. A spring handle 63 connects to the hopper 58 and is adapted to swing the hopper about the swivel connection so that the hopper 58 may be lowered into the water within the filtering compartment 25. The lever arm 63 may hold the hopper 58 in its highest position by engaging a catch 64. By springing the lever arm 63 to one side it may be released from the catch allowing the hopper 58 to lower into the filtering compartment 25. When it is desired to wash the filter the hopper 58 may be lowered as above described thereby receiving the wash water and deliver it through the pipe 59 to the conduit.

Various other forms of my invention will occur to those skilled in the art and I do not wish to confine myself to the exact constructions set forth.

What I claim as my invention and desire to protect by Letters Patent is:—

1. In a water treating apparatus, a downtake, means for filtering sediment from the water and means for washing sediment from the filtering means into the downtake.

2. In a water treating apparatus, a downtake, a filter, means for delivering water to the filter for the purpose of washing the filtering material and means for conveying the wash water from the filter into the downtake.

3. In a water treating apparatus, a sedimentation tank, a conduit leading into the tank, a filter containing material for filtering water, means for delivering water to the filter for the purpose of washing the filtering material and means for conveying wash water from the filter into the conduit.

4. In a water treating apparatus, a sedimentation tank, a conduit leading into the tank, a filtering compartment formed in the tank, means for delivering wash water to the filtering compartment and means for conveying water from the filtering compartment into the conduit.

5. The combination with a water softener having a conduit for water therein, of a filter for filtering sediment from the water and means for washing the sediment from the filter into the conduit.

6. In a water treating apparatus, a sedimentation tank, a conduit extending into the tank, a filtering compartment within the tank, means for conveying water from the filter to the conduit and a valve in the conveying means for controlling the passage of water therethrough.

7. In a water treating apparatus, a sedimentation tank, a conduit extending into the tank, filters within the tank, means for conveying water from the filters to the conduit and a valve in the conveying means, said valve being adapted to control the supply of water through the conveying means.

8. In a water treating apparatus, a sedimentation tank, filters within the tank, a channel connecting the filters whereby the head of water within the filters is equalized and means for leading water from the channel to the tank.

9. In a water treating apparatus, a sedimentation tank, filters for filtering sediment from the water, means connecting the filters whereby the lead within the filters is equalized and means leading from the equalizing means adapted to convey water to the tank.

10. In a water treating apparatus, a tank, a sedimentation chamber formed in the tank, a conduit extending into the tank, a storage chamber formed in the tank, a filter adapted to receive water from the sedimentation chamber, filter it and deliver it to the storage chamber and means for washing sediment from the filter into the conduit.

CASS L. KENNICOTT.

Witnesses:
I. E. DISCHINGER,
H. C. ALGER.